(12) United States Patent
Jin et al.

(10) Patent No.: US 11,641,164 B2
(45) Date of Patent: *May 2, 2023

(54) POWER CONVERSION CIRCUIT AND POWER CONVERSION APPARATUS WITH SAME

(71) Applicant: Delta Electronics, Inc., Taoyuan (TW)

(72) Inventors: Da Jin, Taoyuan (TW); Yahong Xiong, Taoyuan (TW); Qinghua Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,261

(22) Filed: Apr. 28, 2022

(65) Prior Publication Data

US 2022/0255449 A1 Aug. 11, 2022

Related U.S. Application Data

(63) Continuation of application No. 17/115,605, filed on Dec. 8, 2020, now Pat. No. 11,349,404.

(30) Foreign Application Priority Data

Dec. 11, 2019 (CN) .......................... 201911268267.8

(51) Int. Cl.
*H02M 3/158* (2006.01)
*H02M 3/335* (2006.01)
(Continued)

(52) U.S. Cl.
CPC ......... *H02M 3/33584* (2013.01); *H02M 3/01* (2021.05); *H02M 3/07* (2013.01);
(Continued)

(58) Field of Classification Search
CPC .......... H02M 3/01; H02M 3/07; H02M 3/156; H02M 3/158; H02M 3/1584; H02M 3/335;
(Continued)

(56) References Cited

U.S. PATENT DOCUMENTS 10,033,276 B2 * 7/2018 Shenoy ............... H02M 3/1584
10,122,176 B2 * 11/2018 Feng ....................... H02J 3/381
(Continued)

FOREIGN PATENT DOCUMENTS

CN 100403637 C 7/2008
CN 100446390 C 12/2008
(Continued)

OTHER PUBLICATIONS

Daocheng Huang et al., Novel Non-isolated LLC Resonant Converters, IEEE, 2012, pp. 1373-1380.

*Primary Examiner* — Thienvu V Tran
*Assistant Examiner* — Shahzeb K Ahmad
(74) *Attorney, Agent, or Firm* — Kirton McConkie; Evan R. Witt

(57) ABSTRACT

A power conversion circuit includes a first terminal, a second terminal, a first switching conversion unit, a second switching conversion unit, a flying capacitor and a magnetic element. The first switching conversion unit includes a first switch and a third switch. The second switching conversion unit includes a second switch and a fourth switch. The magnetic element includes two first windings and a second winding. A first one of the two first windings is serially connected between the flying capacitor and the second terminal. A second one of the two first windings is serially connected between the second switch and the second terminal. The second winding is serially connected with the flying capacitor and the first one of the two first windings.

(Continued)

A turn ratio between the second winding, the first one of the two first windings and the second one of the two first windings is N:1:1.

17 Claims, 12 Drawing Sheets

(51) Int. Cl.
- *H02M 3/07* (2006.01)
- *H02M 3/00* (2006.01)
- *H02M 1/00* (2006.01)

(52) U.S. Cl.
CPC .......... *H02M 3/158* (2013.01); *H02M 1/0003* (2021.05); *H02M 1/0095* (2021.05); *H02M 3/1584* (2013.01); *H02M 3/33569* (2013.01)

(58) Field of Classification Search
CPC ......... H02M 3/33507; H02M 3/33584; H02M 3/33569; H02M 3/337; H02M 1/0003; H02M 1/0095

See application file for complete search history.

(56) References Cited

U.S. PATENT DOCUMENTS

| | | | |
|---|---|---|---|
| 10,804,798 B1* | 10/2020 | Rizzolatti | H02M 3/33573 |
| 10,833,591 B2* | 11/2020 | Silva | H02M 3/33592 |
| 2012/0249102 A1* | 10/2012 | Cuk | H02M 3/01 |
| | | | 323/282 |
| 2013/0154589 A1* | 6/2013 | Lethellier | H02M 1/44 |
| | | | 323/271 |
| 2016/0329811 A1* | 11/2016 | Du | H02M 1/14 |
| 2020/0153336 A1* | 5/2020 | Mihai | H02J 7/35 |
| 2020/0212795 A1* | 7/2020 | Das | H02M 3/158 |

FOREIGN PATENT DOCUMENTS

| | | |
|---|---|---|
| CN | 100499337 C | 6/2009 |
| CN | 100553093 C | 10/2009 |
| CN | 101510726 B | 9/2010 |
| CN | 101714815 B | 12/2011 |
| CN | 101702578 B | 1/2012 |

* cited by examiner

POWER CONVERSION CIRCUIT AND POWER CONVERSION APPARATUS WITH SAME

CROSS-REFERENCE TO RELATED APPLICATION

This application is a Continuation application of U.S. patent application Ser. No. 17/115,605 filed on Dec. 8, 2020 and entitled "POWER CONVERSION CIRCUIT AND POWER CONVERSION APPARATUS WITH SAME", which claims priority to China Patent Application No. 201911268267.8, filed on Dec. 11, 2019. The entire contents of the above-mentioned patent application are incorporated herein by reference for all purposes.

FIELD OF THE INVENTION

The present invention relates to a power conversion circuit and a power conversion apparatus, and more particularly to a power conversion circuit with an adjustable voltage gain and a power conversion apparatus.

BACKGROUND OF THE INVENTION

Nowadays, the resonant power conversion circuit having a non-isolated circuit topology with extended duty cycle is widely used in the application of high current. The resonant power conversion circuits are usually divided into a symmetrical type and an asymmetrical type. In the prior power conversion circuit, regardless of the type, the voltage gain is set to be fixed, which means the ratio of the output voltage to the input voltage is fixed. That is, the voltage gain cannot be determined and adjusted according to the practical requirements. However, the fixed voltage gain may limit the applications of the resonant power conversion circuit.

SUMMARY OF THE INVENTION

An object of the present invention provides a power conversion circuit with an adjustable voltage gain. Since the voltage gain is adjustable, the applications of the power conversion circuit are expanded.

Another object of the present invention provides a power conversion apparatus with a power conversion circuit.

In accordance with an aspect of the present invention, a power conversion circuit is provided. The power conversion circuit includes a first terminal, a second terminal, a first switching conversion unit, a second switching conversion unit, a flying capacitor and a magnetic element. The first terminal includes a first positive electrode and a first negative electrode. The second terminal includes a second positive electrode and a second negative electrode. The second negative electrode is electrically connected with the first negative electrode. The first switching conversion unit includes a first switch and a third switch, which are electrically connected with each other in series. The second switching conversion unit includes a second switch and a fourth switch, which are electrically connected with each other in series. A first terminal of the first switch is electrically connected with a first terminal of the second switch. A second terminal of the first switch is electrically connected with the first positive electrode. The third switch is serially connected with the first switch. The fourth switch is serially connected with the second switch. A first terminal of the third switch and a first terminal of the fourth switch are electrically connected with the first negative electrode. A second terminal of the fourth switch is electrically connected with a second terminal of the second switch. The first switch, the second switch, the third switch and the fourth switch are periodically operated at a switching cycle. The switching cycle has a duty cycle. The magnetic element includes two first windings and a second winding. The two first windings and the second winding interact with each other to result in an electromagnetic coupling effect. The second terminals of the two first windings are opposite-polarity terminals and electrically connected with the second positive electrode. A first terminal of a first one of the two first windings is electrically connected with a second terminal of the third switch. A first terminal of a second one of the two first windings is electrically connected with the second terminal of the fourth switch and the second terminal of the second switch. The second winding and the flying capacitor are serially connected between the first terminal of the first switch and the first terminal of the first one of the two first windings. Moreover, a turn ratio between the second winding, the first one of the two first windings and the second one of the two first windings is N:1:1, and N is a positive value. The switching cycle comprises a first working period and a second working period. A current flowing through the second winding is equal to a current flowing through the first one of the two first windings during the first working period. The current flowing through the second winding is equal to a current flowing through the second one of the two first windings during the second working period.

In accordance with another aspect of the present invention, power conversion apparatus is provided. The power conversion apparatus includes M power conversion circuits. Each power conversion circuit has the above circuitry structure. The first terminals of the M power conversion circuits are electrically connected with each other. The second terminals of the M power conversion circuits are electrically connected with each other.

In accordance with another aspect of the present invention, a power conversion circuit is provided. The power conversion circuit includes a first terminal, a second terminal, a first flying capacitor, a second flying capacitor, a first switching conversion unit, a second switching conversion unit and a magnetic element. The first terminal includes a first positive electrode and a first negative electrode. The second terminal includes a second positive electrode and a second negative electrode. The second negative electrode is electrically connected with the first negative electrode. The first switching conversion unit includes a first switch, a second switch and a third switch. A first terminal of the first switch is electrically connected with the first positive electrode. A second terminal of the second switch is electrically connected with a first terminal of the third switch. A second terminal of the third switch is electrically connected with the second negative electrode. The second switching conversion unit includes a fourth switch, a fifth switch and a sixth switch. A first terminal of the fourth switch is electrically connected with the first positive electrode. A second terminal of the fifth switch is electrically connected with a first terminal of the sixth switch. A second terminal of the sixth switch is electrically connected with the second negative electrode. A second terminal of the fourth switch is electrically connected with a first terminal of the second switch. A first terminal of the fifth switch is electrically connected with the second terminal of the first switch. The first switch, the second switch, the third switch, the fourth switch, the fifth switch and the sixth switch are periodically operated at a switching cycle. The switching cycle has a duty cycle. The magnetic element includes two first windings and two second windings. The two first windings and the two second windings interact with each other to result in an electromagnetic coupling effect. The second terminals of the two first windings are opposite-polarity terminals and electrically connected with the second positive electrode. A first terminal of a first one of the two first windings is electrically connected with the second terminal of the fifth switch and the first terminal of the sixth switch. A first terminal of a second one of the two first winding is electrically connected with the second terminal of the second switch and the first terminal of the third switch. A first one of the two second windings and the second flying capacitor are serially connected between the second terminal of the fourth switch and the second terminal of the fifth switch. A second one of the two second windings and the first flying capacitor are serially connected between the second terminal of the first switch and the second terminal of the second switch. Moreover, a turn ratio between the first one of the two second windings, the second one of the two second windings, the first one of the two first windings and the second one of the two first windings is N:N:1:1, and N is a positive value. The switching cycle comprises a first working period and a second working period. A total current flowing through the two second windings is equal to a current flowing through the first one of the two first windings during the first working period. The total current flowing through the two second windings is equal to a current flowing through the second one of the two first windings during the second working period.

In accordance with another aspect of the present invention, power conversion apparatus is provided. The power conversion apparatus includes M power conversion circuits. Each power conversion circuit has the above circuitry structure. The first terminals of the M power conversion circuits are electrically connected with each other. The second terminals of the M power conversion circuits are electrically connected with each other.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
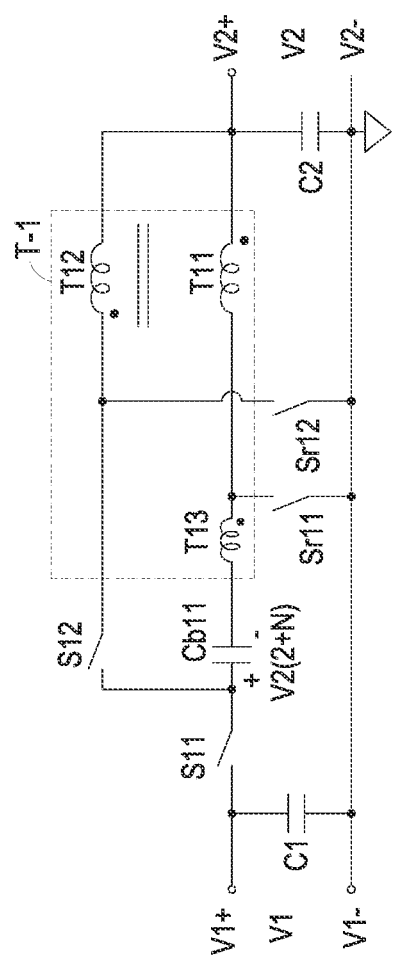
FIG. 1A is a schematic circuit diagram illustrating a power conversion circuit according to a first embodiment of the present invention.
Figure 1B:
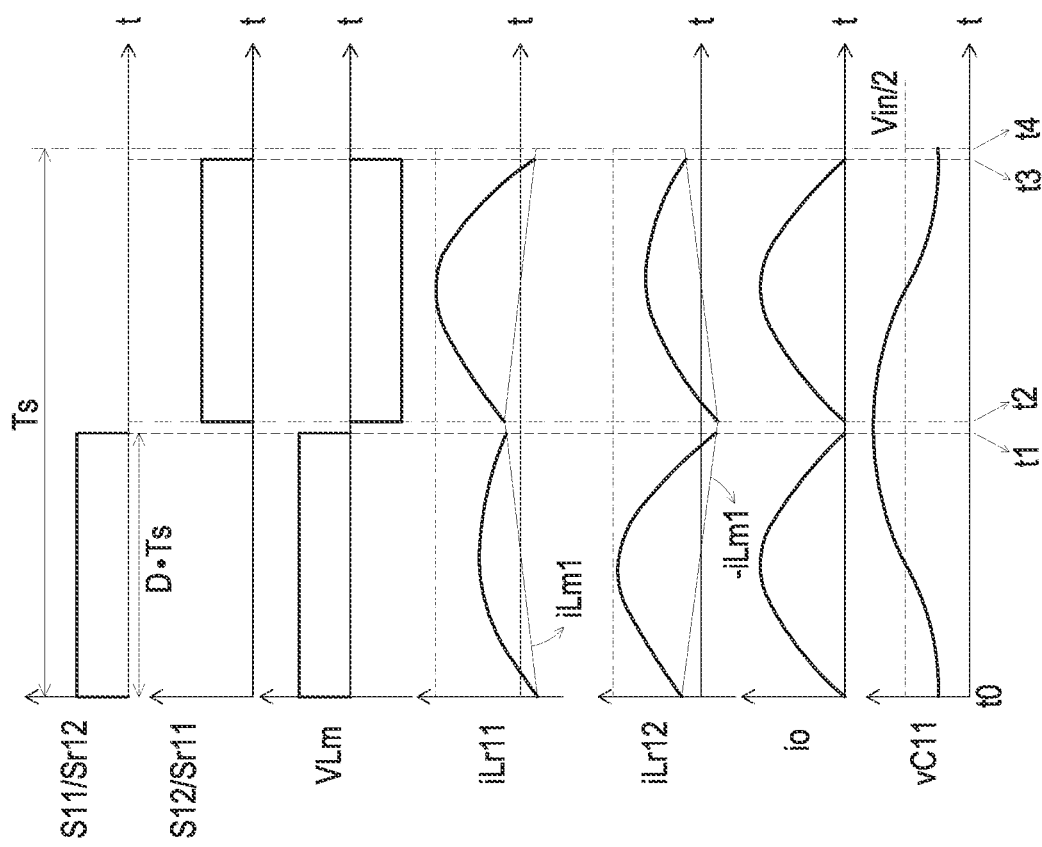
FIG. 1B is a schematic timing waveform diagram illustrating the on/off states of associated switches in the power conversion circuit as shown in FIG. 1A and associated voltage signals and current signals.
Figure 1C:
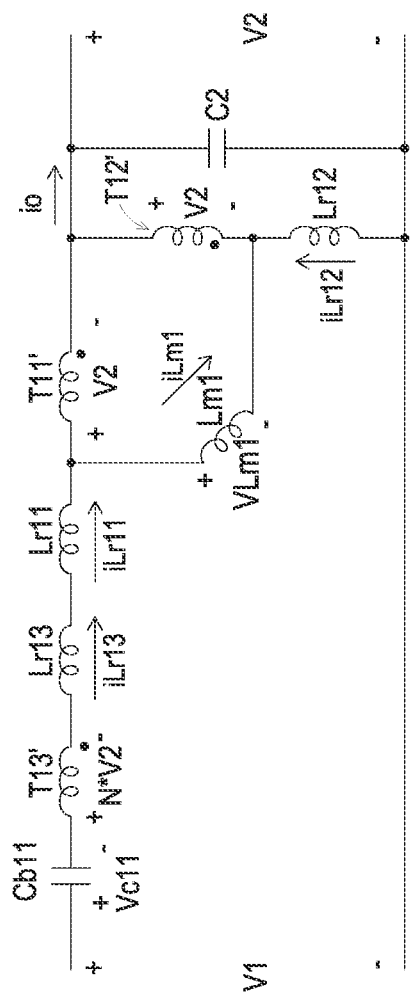
FIG. 1C is a schematic equivalent circuit diagram of the power conversion circuit as shown in FIG. 1A in the time interval between the time point t0 and the time point t1 as shown in FIG. 1B.
Figure 1D:
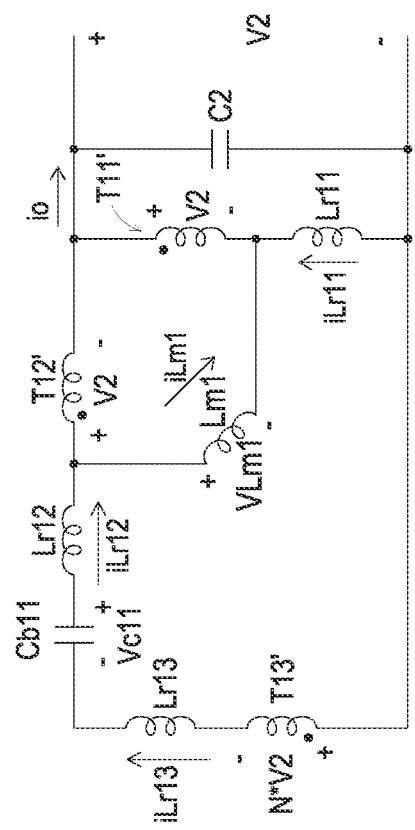
FIG. 1D is a schematic equivalent circuit diagram of the power conversion circuit as shown in FIG. 1A in the time interval between the time point t2 and the time point t3 as shown in FIG. 1B.

FIG. 1A is a schematic circuit diagram illustrating a power conversion circuit according to a first embodiment of the present invention. FIG. 1B is a schematic timing waveform diagram illustrating the on/off states of associated switches in the power conversion circuit as shown in FIG. 1A and associated voltage signals and current signals. FIG. 1C is a schematic equivalent circuit diagram of the power conversion circuit as shown in FIG. 1A in the time interval between the time point t0 and the time point t1 as shown in FIG. 1B. FIG. 1D is a schematic equivalent circuit diagram of the power conversion circuit as shown in FIG. 1A in the time interval between the time point t2 and the time point t3 as shown in FIG. 1B.

The power conversion circuit of the present invention has the function of converting the electric power in a bidirectional manner. In case that a first terminal of the power conversion circuit is an input terminal, a second terminal of the power conversion circuit is an output terminal. In case that the first terminal of the power conversion circuit is the output terminal, the second terminal of the power conversion circuit is the input terminal. Moreover, the power conversion circuit is a resonant power conversion circuit with extended duty cycle.

As shown in FIG. 1A, the circuit topology of the power conversion circuit has an asymmetrical configuration. The power conversion circuit 1 includes a first terminal (including a first positive electrode V1+ and a first negative electrode V1−), a second terminal (including a second positive electrode V2+ and a second negative electrode V2−), a first switching conversion unit, a second switching conversion unit, a first capacitor C1, a second capacitor C2, a flying capacitor Cb11 and a magnetic element T-1. The first negative electrode V1− and the second negative electrode V2− are connected to a ground terminal. The first switching conversion unit includes a first switch S11 and a third switch Sr11, which are electrically connected in series. The second switching conversion unit includes a second switch S12 and a fourth switch Sr12, which are electrically connected in series. The first switch S11, the second switch S12, the third switch Sr11 and the fourth switch Sr12 are periodically operated at a switching cycle Ts. The switching cycle has a duty cycle.

The first terminal of the first switch S11 is electrically connected with the first terminal of the second switch S12. The second terminal of the first switch S11 is electrically connected with the first positive electrode V1+. The second terminal of the fourth switch Sr12 is electrically connected with the second terminal of the second switch S12. The first terminal of the third switch Sr11 and the first terminal of the fourth switch Sr12 are connected with the first negative electrode V1−. The on/off states of the first switch S11 and the fourth switch Sr12 are identical. The on/off states of the second switch S12 and the third switch Sr11 are identical. The phase difference between a control signal of the first switch S11 and a control signal of the second switch S12 is 180 degrees. The ON time durations of the first switch S11 and the second switch S12 are less than or equal to 0.5×Ts and greater than or equal to 0.4×Ts. The first capacitor C1 is electrically connected between the first positive electrode V1+ and the first negative electrode V1−. The second capacitor C2 is electrically connected between the second positive electrode V2+ and the second negative electrode V2−.

The magnetic element T-1 includes two first windings T11, T12 and a second winding T13. These windings are wound around the same pillar of a magnetic core of the magnetic element to result in an electromagnetic coupling effect. The second terminals of the two first windings T11 and T12 are electrically connected with the second positive electrode V2+. The second terminals of the two first windings T11 and T12 are opposite-polarity terminals. The first terminal of the first winding T11 is electrically connected with the second terminal of the third switch Sr11. The first terminal of the first winding T12 is electrically connected with the second terminal of the fourth switch Sr12 and the second terminal of the second switch S12. The second winding T13 and the flying capacitor Cb11 are connected with each other in series to form a serially-connected branch. The first end of the serially-connected branch is connected with the first terminal of the first switch S11. The second end of the serially-connected branch is connected with the second terminal of the third switch Sr11 and the first terminal of the first winding T11. The turn ratio between the second winding T13, the first winding T11 and the first winding T12 is N:1:1, wherein N is a positive value, and preferably a positive integer.

In the serially-connected branch, the positions and sequence of the second winding T13 and the flying capacitor Cb11 are not restricted. In an embodiment, the first terminal of the second winding T13 is electrically connected with the first terminal of the first winding T11. The first terminal of the second winding T13 and the first terminal of the first winding T11 are opposite-polarity terminals. The second terminal of the second winding T13 is electrically connected with the flying capacitor Cb11. In another embodiment, a terminal of the flying capacitor Cb11 is electrically connected with the first terminal of the first winding T11, and the other terminal of the flying capacitor Cb11 is electrically connected with the first terminal of the second winding T13. The first terminal of the second winding T13 and the first terminal of the first winding T11 are opposite-polarity terminals.

The working principle of the power conversion circuit 1 will be described as follows. For illustration, taking the first terminal of the power conversion circuit 1 as the input terminal, and the second terminal of the power conversion circuit 1 as the output terminal for example.

Please refer to FIGS. 1B, 1C and 1D again. When the power conversion circuit 1 is in a steady state, the time interval between the time point t0 and the time point t4 is equal to the switching cycle Ts.

In the time interval between the time point t0 and the time point t1, the first switch S11 and the fourth switch Sr12 are in the on state. This time interval is also referred as a first working period. The flying capacitor Cb11 is charged by the input voltage V1 through the first switch S11. The electric energy is transmitted from the input terminal to the output terminal through the second winding T13 and the first winding T11. The first winding T12 is in a freewheeling state through the fourth switch Sr12. Meanwhile, the current flowing through the second winding T13 is equal to the current flowing through the first winding T11. The equivalent circuit diagram is shown in FIG. 1C. In FIG. 1C, T11', T12' and T13' are the ideal windings corresponding to the windings T11, T12 and T13, Lr11, Lr12 and Lr13 are equivalent leakage inductors corresponding to the windings, and Lm1 is an equivalent magnetized inductor of the magnetic element T-1. Due to the resonant effect between the equivalent resonant inductor of the power conversion circuit 1 (i.e., the equivalent resonant inductor resulted by the equivalent leakage inductors Lr11, Lr12 and Lr13) and the flying capacitor Cb11, the resonant currents iLr11 and iLr12 are generated. The equivalent magnetized current generated by the magnetic element T-1 is iLm1.

The associated voltages of the power conversion circuit 1 can be seen in FIG. 1C. The voltage between the two terminals of the ideal first winding T12' is equal to the voltage V2 of the second terminal of the power conversion circuit 1. As mentioned above, the turn ratio between the second winding T13, the first winding T11 and the first winding T12 is N:1:1. Consequently, the voltage between the two terminals of the ideal first winding T11' is also equal to the voltage V2, and the voltage between the two terminals of the ideal second winding T13' is equal to N×V2.

Consequently, the voltage V1 of the first terminal of the power conversion circuit 1 may be expressed by the following mathematical formula:

$$V1 = Vc11 + (2+N) \times V2 \tag{1}$$

In the above mathematic formula, Vc11 is the terminal voltage of the flying capacitor Cb11.

At the time point t1, the resonant currents iLr11 and iLr12 are equal to the magnetized currents iLm1 and −iLm1, respectively. Meanwhile, the first switch S11 and the fourth switch Sr12 are turned off. Since the zero current switching (ZCS) function is achieved, the switching loss is decreased and the energy transfer efficiency of the power conversion circuit 1 is enhanced.

In the time interval between the time point t1 and the time point t2, all switches are turned off. The magnetized current iLm1 flowing through the magnetic element T-1 is in the freewheeling state. In addition, the charges on the parasitic capacitors of the second switch S12 and the third switch Sr11 are extracted. Consequently, the terminal voltages of the second switch S12 and the third switch Sr11 are decreased. In an embodiment, the second switch S12 and the third switch Sr11 are turned on when the terminal voltages of the second switch S12 and the third switch Sr11 are decreased to 50% of the respective initial voltages (i.e., the terminal voltages at the time point t1). Consequently, the switching loss is decreased, and the energy transfer efficiency and the power density of the power conversion circuit 1 are enhanced.

In another embodiment, the inductance of the magnetic element T-1 is controlled. Consequently, the inductance of the equivalent magnetized inductor Lm1 of the magnetic element T-1 is low enough, and the magnetized current iLm1 flowing through the equivalent magnetized inductor Lm1 is high enough. Since the charges on the parasitic capacitors of the second switch S12 and the third switch Sr11 are extracted completely, the terminal voltages of the second switch S12 and the third switch Sr11 are decreased to zero. At this time, the second switch S12 and the third switch Sr11 are turned on. Consequently, the zero voltage switching (ZVS) function is achieved. In such way, the switching loss is further decreased, and the energy transfer efficiency and the power density of the power conversion circuit 1 are further enhanced.

In the time interval between the time point t2 and the time point t3, the second switch S12 and the third switch Sr11 are in the on state. This time interval is also referred as a second working period. The energy stored in the flying capacitor Cb11 is transmitted to the output terminal through the second switch S12, the first winding T12, the third switch Sr11 and the second winding T13. The first winding T11 is in the freewheeling state through the third switch Sr11. Meanwhile, the current flowing through the second winding T13 is equal to the current flowing through the first winding T12. The equivalent circuit diagram is shown in FIG. 1D. Due to the resonant effect between the of the power conversion circuit 1 (i.e., the equivalent resonant inductor resulted by the leakage inductors Lr11, Lr12 and Lr13) and the flying capacitor Cb11, the resonant currents iLr11 and iLr12 are generated. The equivalent magnetized current generated by the magnetic element T-1 is iLm1.

The associated voltages of the power conversion circuit 1 can be seen in FIG. 1D. The voltage between the two terminals of the ideal first winding T11' is equal to the voltage V2 of the second terminal of the power conversion circuit 1. As mentioned above, the turn ratio between the second winding T13, the first winding T11 and the first winding T12 is N:1:1. Consequently, the voltage between the two terminals of the ideal first winding T12' is also equal to the voltage V2, and the voltage between the two terminals of the ideal second winding T13' is equal to N×V2.

Consequently, the voltage Vc11 of the flying capacitor Cb11 may be expressed by the following mathematical formula:

$$Vc11 = (2+N) \times V2 \quad (2)$$

The energy stored in the flying capacitor Cb11 in the time interval between the time point t0 and the time point t1 is transmitted to the output terminal in the time interval between the time point t2 and the time point t3. Consequently, after the formula (2) is introduced into the formula (1), the voltage V1 of the first terminal of the power conversion circuit 1 may be deduced as: V1=(4+2N)×V2.

At the time point t3, the resonant currents iLr11 and iLr12 are equal to the magnetized currents iLm1 and −iLm1, respectively. Meanwhile, the second switch S12 and the third switch Sr11 are turned off. Since the zero current switching (ZCS) function is achieved, the switching loss is decreased and the energy transfer efficiency of the power conversion circuit 1 is enhanced.

In the time interval between the time point t3 and the time point t4, all switches are turned off. The magnetized current iLm1 flowing through the first windings T11 and T12 is in the freewheeling state. In addition, the charges on the parasitic capacitors of the first switch S11 and the fourth switch Sr12 are extracted. Consequently, the terminal voltages of the first switch Si 1 and the fourth switch Sr12 are decreased. In an embodiment, the first switch S11 and the fourth switch Sr12 are turned on when the terminal voltages of the first switch S11 and the fourth switch Sr12 are decreased to 50% of the respective initial voltages (i.e., the terminal voltages at the time point t1). Consequently, the switching loss is decreased, and the energy transfer efficiency and the power density of the power conversion circuit 1 are enhanced.

In another embodiment, the inductance of the magnetic element T-1 is controlled. Consequently, the inductance of the equivalent magnetized inductor Lm1 of the magnetic element T-1 is low enough, and the magnetized current iLm1 flowing through the equivalent magnetized inductor Lm1 is high enough. Since the charges on the parasitic capacitors of the first switch S11 and the fourth switch Sr12 are extracted completely, the terminal voltages of the first switch S11 and the fourth switch Sr12 are decreased to zero. At this time, the first switch S11 and the fourth switch Sr12 are turned on. Consequently, the zero voltage switching (ZVS) function is achieved. In such way, the switching loss is further decreased, and the energy transfer efficiency and the power density of the power conversion circuit 1 are further enhanced.

In the time interval between the time point t0 and the time point t1 and in the time interval between the time point t2 and the time point t3, the resonant current iLr11 flows through the first winding T11 and the resonant current iLr12 flows through the first winding T12. In addition, the frequency of each of the resonant current iLr11 and the resonant current iLr12 is equal to the switching frequency. In this embodiment, the resonant cycle and the switching cycle are nearly equal.

In some other embodiments, the capacitance of the flying capacitor Cb11 is larger, and the inductance of the equivalent resonant inductor is smaller. Consequently, if the resonant currents iLr11 and iLr12 are respectively greater than the magnetized currents iLm1 and −iLm1 in the time interval between the time point t0 and the time point t1, the corresponding switches are turned off. If the resonant currents iLr11 and iLr12 are respectively greater than −iLm1 and iLm1 in the time interval between the time point t2 and the time point t3, the corresponding switches are turned off. The turn-off current is greater than zero. However, since the inductance of the equivalent resonant inductor is low, the power loss caused by the non-zero current turning-off action may be neglected. In other words, the switching cycle of the power conversion circuit 1 is less than or equal to the resonant cycle of the resonant current. For reducing the power loss and increasing the energy transfer efficiency, it is preferred that the switching cycle Ts is greater than or equal to a half of the resonant cycle.

In an embodiment, the ratio of the input voltage V1 to the output voltage V2 of the power conversion circuit 1 is (4+2N):1. That is, the ratio of the input voltage V1 to the output voltage V2 may be adjusted according to the change of N. In this embodiment, the magnetic element T-1 includes the two first windings T11, T12 and the second winding T13. These windings interact with each other to result in the electromagnetic coupling effect. Moreover, the turn ratio between the second winding T13, the first winding T11 and the first winding T12 is N:1:1. The second winding T13 is disposed on a specific position of the power conversion circuit 1. Since the voltage gain of the power conversion circuit 1 is adjustable according to the turn number of the second winding T13, the applications of the power conversion circuit 1 are expanded.

In the embodiment, as shown in FIGS. 1C and 1D, the equivalent leakage inductors corresponding to the first windings T11, T12 and the second winding T13 are Lr11, Lr12 and Lr13, respectively. For clearly analyzing the relationship between the resonant currents, the magnetized current iLm1 and the magnetized voltage VLm1 of the equivalent magnetized inductor Lm1 are neglected in the following example. In the time interval between the time point t0 and the time point t1 and the time interval between the time point t2 and the time point t3, the resonant effect between the flying capacitor Cb11 and the equivalent leakage inductors Lr11, Lr12 and Lr13 is generated. In this embodiment, the resonant capacitor of the power conversion circuit 1 is the flying capacitor Cb11, and the equivalent resonant inductance is the sum of the inductances of the equivalent leakage inductors Lr11, Lr12 and Lr13. If the magnetized current iLm1 is neglected, the output current io of the power conversion circuit 1 may be expressed by the following mathematic formula:

$$io = iLr11 + iLr12 \quad (3)$$

In the above mathematic formula, iLr11 is the resonant current flowing through the equivalent leakage inductor Lr11, and iLr12 is the resonant current flowing through the equivalent leakage inductor Lr12.

In the time interval between the time point t0 and the time point t1, the resonant current iLr13 flowing through the equivalent leakage inductor Lr13 is equal to the resonant current iLr11 flowing through the equivalent leakage inductor Lr11. That is, $$iLr13 = iLr11 \quad (4)$$

According to the magnetic potential balance principle, the following mathematic formula is obtained.

$$N \times iLr13 + iLr11 = iLr12 \quad (5)$$

According to the above mathematic formulae (3), (4) and (5), the resonant current iLr12 is equal to (N+1)×io/(N+2), and the resonant current iLr11 is equal to io/(N+2).

In the time interval between the time point t2 and the time point t3, the resonant current iLr13 flowing through the equivalent leakage inductor Lr13 is equal to the resonant current iLr12 flowing through the equivalent leakage inductor Lr12. That is, $$iLr13 = iLr12 \quad (6)$$

According to the magnetic potential balance principle, the following mathematic formula is obtained.

$$N \times iLr13 + iLr12 = iLr11 \quad (7)$$

According to the above mathematic formulae (3), (6) and (7), the resonant current iLr11 is equal to (N+1)×io/(N+2), and the resonant current iLr12 is equal to io/(N+2).

From the above descriptions, the voltage gain of the power conversion circuit 1 is adjustable according to the turn number of the second winding T13 of the magnetic element T-1. The sum of the resonant currents iLr11 and iLr12 in the time interval between the time point t0 and the time point t1 and the sum of the resonant currents iLr11 and iLr12 in the time interval between the time point t2 and the time point t3 are equal. In other words, the resonant effect of the power conversion circuit 1 is not influenced by the second winding T13. The terminal voltage Vc11 of the flying capacitor is obtained by superimposing a DC voltage with an AC resonant voltage. Typically, the DC voltage is equal to Vin/2, and thus the ratio of the DC voltage to the input voltage is 0.5. When the device parameter distribution and other factors are taken into consideration, the ratio of the DC voltage to the input voltage (i.e., the terminal voltage of the first terminal of the power conversion circuit 1) is in the range between 0.4 and 0.6. The amplitude of the AC resonant voltage of the terminal voltage Vc11 is determined according to the inductance of the equivalent resonant inductor, the capacitance of the equivalent resonant capacitor, the switching frequency of the power conversion circuit and the size of the load.

In the above embodiment, the equivalent resonant inductor comprises the leakage inductance caused by the coupling effect of the first windings T11, T12 and the second winding T13 and the parasitic inductance of the wiring structure. When the resonant cycle, the switching cycle and the capacitance of the flying capacitor Cb11 are taken into consideration, the coupling efficiency between every two of the first windings T11, T12 and the second winding T13 is preferably greater than 0.9, but it is not limited thereto.

Figure 1E:
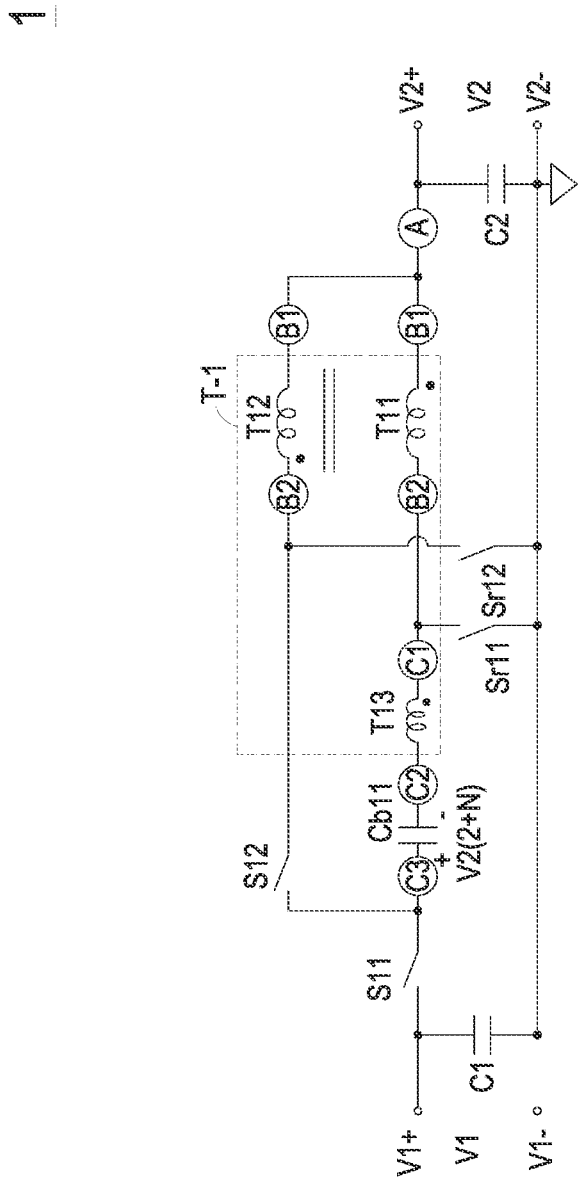
FIG. 1E is a schematic circuit diagram illustrating a power conversion circuit according to a second embodiment of the present invention.

FIG. 1E is a schematic circuit diagram illustrating a power conversion circuit according to a second embodiment of the present invention. In comparison with the first embodiment, the power conversion circuit of this embodiment further includes at least one external inductor (not shown). The position of the at least one external inductor may be determined according to the practical requirements. In an example, one external inductor is serially connected between the second terminal of the first windings T11 or T12 and the second positive electrode V2+. That is, the external inductor is located at the position A. In another embodiment, two external inductors with the same inductance are serially connected with two first windings T11 and T12. That is, the two external inductors are located at the positions B1 or/and B2. In an example, at least one external inductor is serially connected to the flying capacitor Cb11 and the second winding T13 in the serially-connected branch. For example, one external inductor is located at the position C1, C2 or C3, two external inductors are respectively located at two of the positions C1, C2 and C3, or three external inductors are respectively located at the positions C1, C2 and C3. Consequently, a suitable resonant cycle is acquired. Nevertheless, the at least one external inductor is serially connected between the first terminal of the first switch S11 and the second positive electrode V2+.

In some embodiments, the third switch Sr11 and the fourth switch Sr12 are replaced by diodes. The diodes are used as freewheeling diodes. The switching cycle of the power conversion circuit is less than or equal to the resonant cycle. The equivalent circuit and the current waveform are similar to those of the above embodiment, and not redundantly described herein. For example, the switches are controllable switches such as MOS switches, SiC switches or GaN switches.

As mentioned above, the power conversion circuit 1 of the present invention has the function of converting the electric power in the bidirectional manner. Consequently, in case that the first terminal of the power conversion circuit 1 is the output terminal, the second terminal of the power conversion circuit 1 is the input terminal. The operations are similar to those of the first embodiment, and are not redundantly described herein. Under this circumstance, the ratio of the input voltage to the output voltage of the power conversion circuit 1 is 1:(4+2N).

Figure 2A:
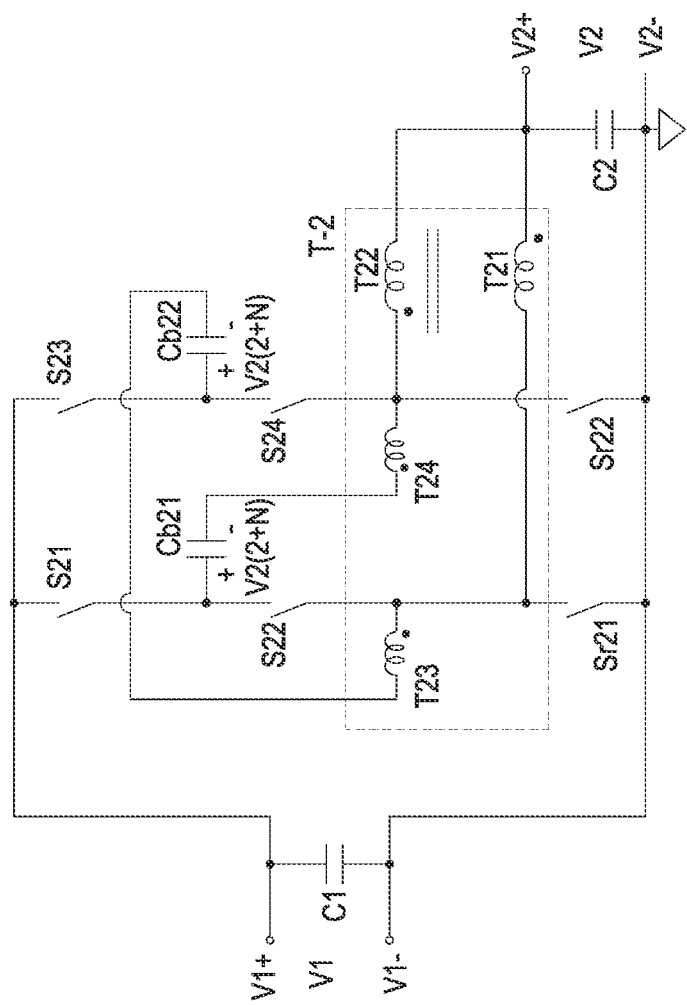
FIG. 2A is a schematic circuit diagram illustrating a power conversion circuit according to a third embodiment of the present invention.
Figure 2B:
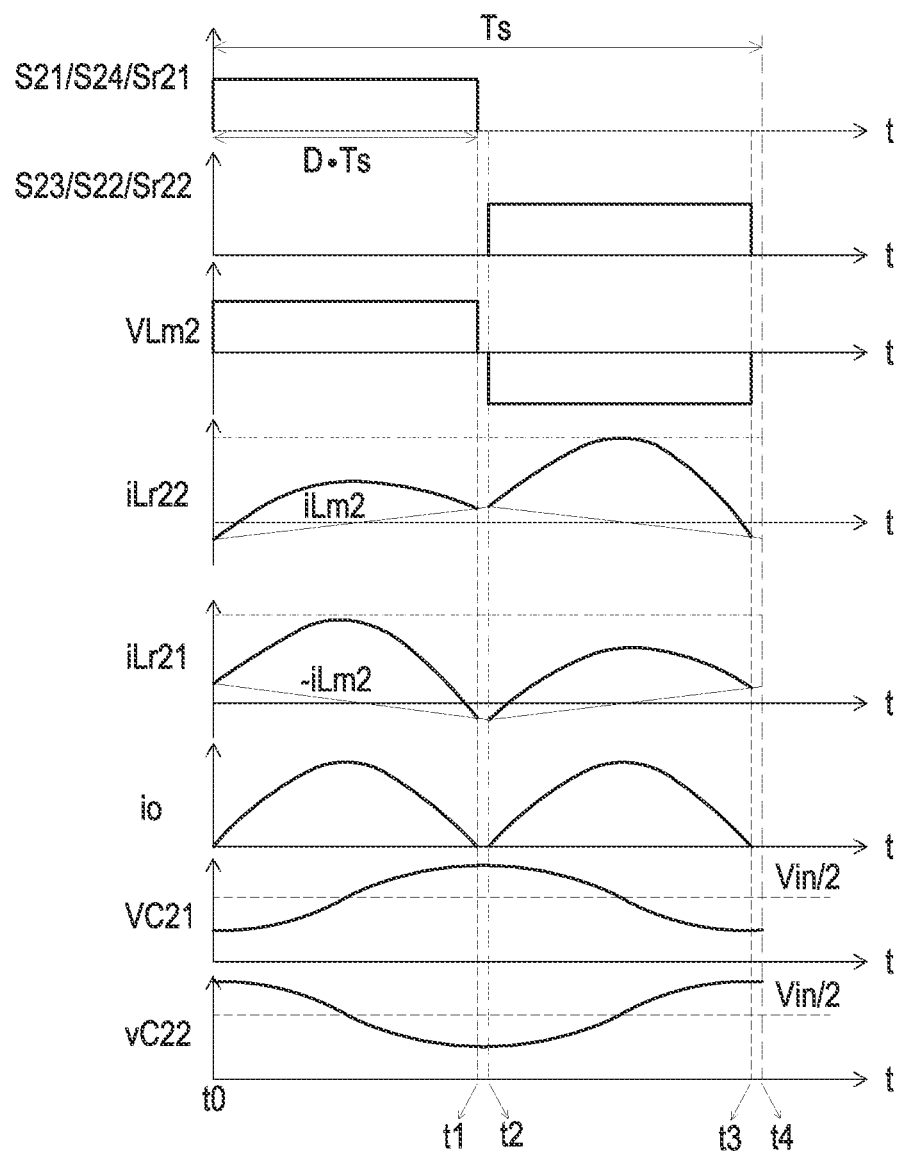
FIG. 2B is a schematic timing waveform diagram illustrating the on/off states of associated switches in the power conversion circuit as shown in FIG. 2A and associated voltage signals and current signals.
Figure 2C:
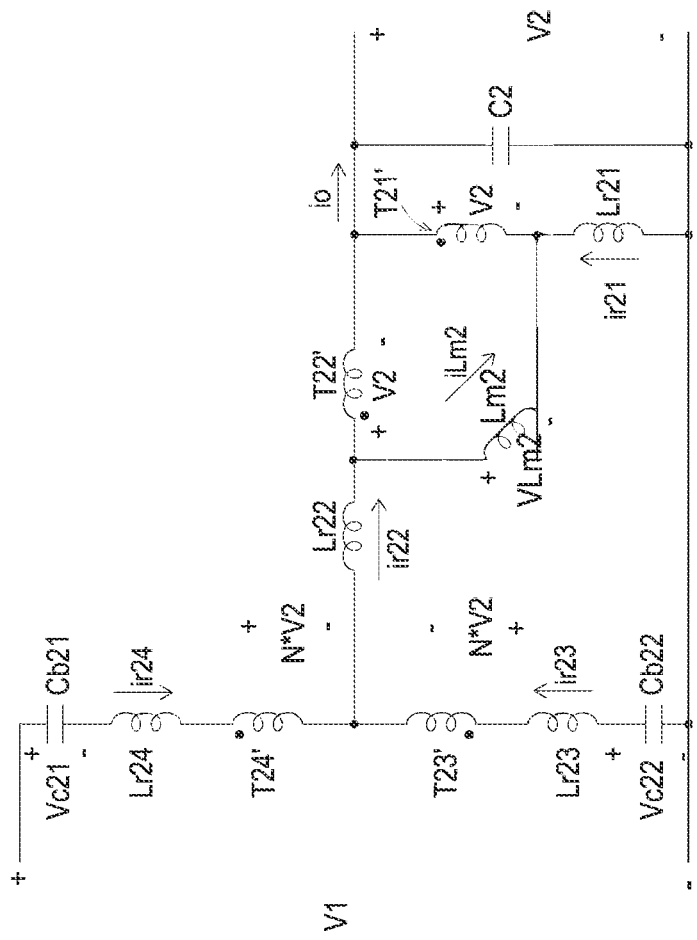
FIG. 2C is a schematic equivalent circuit diagram of the power conversion circuit as shown in FIG. 2A in the time interval between the time point t0 and the time point t1 as shown in FIG. 2B.
Figure 2D:
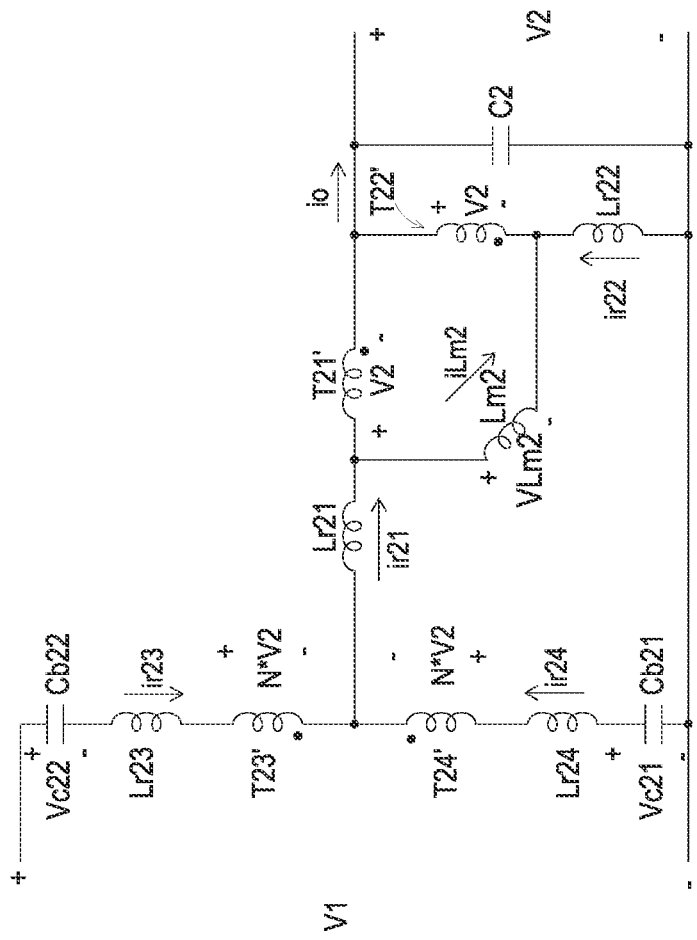
FIG. 2D is a schematic equivalent circuit diagram of the power conversion circuit as shown in FIG. 2A in the time interval between the time point t2 and the time point t3 as shown in FIG. 2B.

FIG. 2A is a schematic circuit diagram illustrating a power conversion circuit according to a third embodiment of the present invention. FIG. 2B is a schematic timing waveform diagram illustrating the on/off states of associated switches in the power conversion circuit as shown in FIG. 2A and associated voltage signals and current signals. FIG. 2C is a schematic equivalent circuit diagram of the power conversion circuit as shown in FIG. 2A in the time interval between the time point t0 and the time point t1 as shown in FIG. 2B. FIG. 2D is a schematic equivalent circuit diagram of the power conversion circuit as shown in FIG. 2A in the time interval between the time point t2 and the time point t3 as shown in FIG. 2B. As shown in FIG. 2A, the circuit topology of the power conversion circuit 2 has a symmetrical configuration. The power conversion circuit 2 includes a first terminal (including a first positive electrode V1+ and a first negative electrode V1−), a second terminal (including a second positive electrode V2+ and a second negative electrode V2−), a first capacitor C1, a second capacitor C2, a first flying capacitor Cb21, a second flying capacitor Cb22, a first switching conversion unit, a second switching conversion unit and a resonant circuit T-2. The first negative electrode V1− and the second negative electrode V2− are connected to a ground terminal.

The first switching conversion unit includes a first switch S21, a second switch S24 and a third switch Sr22. The second switching conversion unit includes a fourth switch S23, a fifth switch S22 and a sixth switch Sr21. The circuitry structure of the second switching conversion unit is similar to the circuitry structure of the first switching conversion unit. The first terminal of the first switch S21 is electrically connected with the first positive electrode V1+. The second terminal of the first switch S21 is electrically connected with the first terminal of the fifth switch S22. The second terminal of the fifth switch S22 is electrically connected with the first terminal of the sixth switch Sr21. The second terminal of the sixth switch Sr21 is electrically connected with the second negative electrode V2−. The first terminal of the fourth switch S23 is electrically connected with the first positive electrode V1+, and the fourth switch S23 and the first switch S21 are connected in parallel. The second terminal of the fourth switch S23 is electrically connected with the first terminal of the second switch S24. The second terminal of the second switch S24 is electrically connected with the first terminal of the third switch Sr22. The second terminal of the third switch Sr22 is electrically connected with the second negative electrode V2−. The first terminal of the first flying capacitor Cb21 is electrically connected with the second terminal of the first switch S21 and the first terminal of the fifth switch S22. The second terminal of the first flying capacitor Cb21 is electrically connected with the second terminal of the second switch S24 and the first terminal of the third switch Sr22. The first terminal of the second flying capacitor Cb22 is electrically connected with the second terminal of the fourth switch S23 and the first terminal of the second switch S24. The second terminal of the second flying capacitor Cb22 is electrically connected with the second terminal of the fifth switch S22 and the first terminal of the sixth switch Sr21. The first switch S21, the second switch S24, the third switch Sr22, the fourth switch S23, the fifth switch S22 and the sixth switch Sr21 are periodically operated at a switching cycle Ts. The switching cycle has a duty cycle.

The on/off states of the first switch S21, the second switch S24 and the sixth switch Sr21 are identical. The on/off states of the fourth switch S23, the fifth switch S22 and the third switch Sr22 are identical. The phase difference between the control signal of the first switch S21 and the control signal of the fourth switch S23 is 180 degrees. The time durations of the first switch S21 and the fourth switch S23 are less than or equal to 0.5×Ts and greater than or equal to 0.4×Ts. The first capacitor C1 is electrically connected between the first positive electrode V1+ and the first negative electrode V1−. The second capacitor C2 is electrically connected between the second positive electrode V2+ and the second negative electrode V2−.

The magnetic element T-2 includes two first windings T21, T22 and two second windings T23, T24. These windings are wound around the same pillar of a magnetic core of the magnetic element to result in an electromagnetic coupling effect. The second terminals of the two first windings T21 and T22 are electrically connected with the second positive electrode V2+. The second terminals of the two first windings T21 and T22 are opposite-polarity terminals. The first terminal of the first winding T21 is electrically connected with the second terminal of the fifth switch S22 and the first terminal of the sixth switch Sr21. The first terminal of the first winding T22 is electrically connected with the second terminal of the second switch S24 and the first terminal of the third switch Sr22. The second winding T23 and the second flying capacitor Cb22 are connected with each other in series to form a first serially-connected branch. The first serially-connected branch is connected between the second terminal of the fourth switch S23 and the second terminal of the fifth switch S22. The second winding T24 and the first flying capacitor Cb21 are connected with each other in series to form a second serially-connected branch. The second serially-connected branch is connected between the second terminal of the first switch S21 and the second terminal of the second switch S24. The turn ratio between the second winding T23, the second winding T24, the first winding T21 and the first winding T22 is N:N:1:1, wherein N is a positive value, and preferably a positive integer.

In the first serially-connected branch, the positions and sequence of the second winding T23 and the second flying capacitor Cb22 are not restricted. In an embodiment, the first terminal of the second winding T23 is electrically connected with the first terminal of the first winding T21. The first terminal of the second winding T23 and the first terminal of the first winding T21 are opposite-polarity terminals. The second terminal of the second winding T23 is electrically connected with the second flying capacitor Cb22. In another embodiment, a terminal of the second flying capacitor Cb22 is electrically connected with the first terminal of the first winding T21, and the other terminal of the second flying capacitor Cb22 is electrically connected with the first terminal of the second winding T23. The first terminal of the second winding T23 and the first terminal of the first winding T21 are opposite-polarity terminals.

In the second serially-connected branch, the positions and sequence of the second winding T24 and the first flying capacitor Cb21 are not restricted. In an embodiment, the first terminal of the second winding T24 is electrically connected with the first terminal of the first winding T22. The first terminal of the second winding T24 and the first terminal of the first winding T22 are opposite-polarity terminals. The second terminal of the second winding T24 is electrically connected with the first flying capacitor Cb21. In another embodiment, a terminal of the first flying capacitor Cb21 is electrically connected with the first terminal of the first winding T22, and the other terminal of the first flying capacitor Cb21 is electrically connected with the first terminal of the second winding T24. The first terminal of the second winding T24 and the first terminal of the first winding T22 are opposite-polarity terminals.

The working principle of the power conversion circuit 2 will be described as follows. For illustration, taking the first terminal of the power conversion circuit 2 as the input terminal, and the second terminal of the power conversion circuit 2 as the output terminal for example.

Please refer to FIGS. 2B, 2C and 2D again. When the power conversion circuit 2 is in a steady state, the time interval between the time point t0 and the time point t4 is equal to the switching cycle Ts.

In the time interval between the time point t0 and the time point t1, the first switch S21, the second switch S24 and the sixth switch Sr21 are in the on state. This time interval is also referred as a first working period. The first flying capacitor Cb21 is charged by the input voltage V1 through the first switch S21. The electric energy is transmitted from the input terminal to the output terminal through the second winding T24 and the first winding T22. The energy stored in the second flying capacitor Cb22 is transmitted to the output terminal through the second switch S24, the first winding T22, the sixth switch Sr21 and the second winding T23. The first winding T21 is in a freewheeling state through the sixth switch Sr21. Meanwhile, the sum of the current flowing through the second winding T23 and the current flowing through the second winding T24 is equal to the current flowing through the first winding T22. The equivalent circuit diagram is shown in FIG. 2C. In FIG. 2C, T21', T22', T23' and T24' are the ideal windings corresponding to the windings T21, T22, T23 and T24, Lr21, Lr22, Lr23 and Lr24 are equivalent leakage inductors corresponding to the windings, and Lm2 is an equivalent magnetized inductor of the magnetic element T-2. Due to the resonant effect between the power conversion circuit 2 (i.e., the equivalent resonant inductor resulted from the equivalent leakage inductors Lr21, Lr22, Lr23 and Lr24) and the flying capacitors Cb21 and Cb22, the resonant currents iLr21 and iLr22 are generated. The equivalent magnetized current generated by the magnetic element T-2 is iLm2.

The associated voltages of the power conversion circuit 2 can be seen in FIG. 2C. The voltage between the two terminals of the ideal first winding T21' is equal to the voltage V2 of the second terminal of the power conversion circuit 2. As mentioned above, the turn ratio between the second winding T23, the second winding T24, the first winding T21 and the first winding T22 is N:N:1:1. Consequently, the voltage between the two terminals of the ideal first winding T22' is also equal to the voltage V2, the voltage between the two terminals of the ideal second winding T23' is equal to N×V2, and the voltage between the two terminals of the ideal second winding T24' is equal to N×V2.

Consequently, the voltage V1 of the first terminal of the power conversion circuit 2 and the voltage Vc22 of the second flying capacitor Cb22 may be expressed by the following mathematical formula:

$$V1 = Vc21 + (2+N) \times V2 \quad (8); \text{ and}$$

$$Vc22 = (2+N) \times V2 \quad (9)$$

In the above mathematic formula, Vc21 is the terminal voltage of the first flying capacitor Cb21, and Vc22 is the terminal voltage of the second flying capacitor Cb22. At the time point t1, the resonant currents iLr21 and iLr22 are equal to the magnetized currents iLm1 and -iLm1, respectively. Meanwhile, the first switch S21, the second switch S24 and the sixth switch Sr21 are turned off. Since the zero current switching (ZCS) function is achieved, the switching loss is decreased and the energy transfer efficiency of the power conversion circuit 2 is enhanced.

In the time interval between the time point t1 and the time point t2, all switches are turned off. The magnetized current iLm2 flowing through the magnetic element T-2 is in the freewheeling state. In addition, the charges on the parasitic capacitors of the fourth switch S23, the fifth switch S22 and the third switch Sr22 are extracted. Consequently, the terminal voltages of the fourth switch S23, the fifth switch S22 and the third switch Sr22 are decreased. In an embodiment, the fourth switch S23, the fifth switch S22 and the third switch Sr22 are turned on when the terminal voltages of the fourth switch S23, the fifth switch S22 and the third switch Sr22 are decreased to 50% of the respective initial voltages (i.e., the terminal voltages at the time point t1). Consequently, the switching loss is decreased, and the energy transfer efficiency and the power density of the power conversion circuit 2 are enhanced.

In another embodiment, the inductance of the magnetic element T-2 is controlled. Consequently, the inductance of the equivalent magnetized inductor Lm2 of the magnetic element T-2 is low enough, and the magnetized current iLm2 flowing through the equivalent magnetized inductor Lm2 is high enough. Since the charges on the parasitic capacitors of the fourth switch S23, the fifth switch S22 and the third switch Sr22 are extracted completely, the terminal voltages of the fourth switch S23, the fifth switch S22 and the third switch Sr22 are decreased to zero. At this time, the fifth switch S22 and the third switch Sr22 are turned on, the fourth switch S23, the fifth switch S22 and the third switch Sr22 are turned on. Consequently, the zero voltage switching (ZVS) function is achieved. In such way, the switching loss is further decreased, and the energy transfer efficiency and the power density of the power conversion circuit 2 are further enhanced.

In the time interval between the time point t2 and the time point t3, the fourth switch S23, the fifth switch S22 and the third switch Sr22 are in the on state. This time interval is also referred as a second working period. The voltage V1 of the input terminal is transmitted to the second flying capacitor Cb22 through the fourth switch S23 so as to charge the second flying capacitor Cb22. In addition, the energy stored in the second flying capacitor Cb22 is transmitted to the output terminal through the second winding T23 and the first winding T21. The energy stored in the first flying capacitor Cb21 is transmitted to the output terminal through the fifth switch S22, the first winding T21, the third switch Sr22 and the second winding T24. The first winding T22 is in the freewheeling state through the third switch Sr22. Meanwhile, the sum of the current flowing through the second winding T23 and the current flowing through the second winding T24 is equal to the current flowing through the first winding T21. The equivalent circuit diagram is shown in FIG. 2D. Due to the resonant effect between the power conversion circuit 2 (i.e., the equivalent resonant inductor resulted from the equivalent leakage inductors Lr21, Lr22, Lr23 and Lr24) and the flying capacitors Cb21 and Cb22, the resonant currents iLr21 and iLr22 are generated. The equivalent magnetized current generated by the magnetic element T-2 is iLm2.

The associated voltages of the power conversion circuit 2 can be seen in FIG. 2D. The voltage between the two terminals of the ideal first winding T22' is equal to the voltage V2 of the second terminal of the power conversion circuit 2. As mentioned above, the turn ratio between the second winding T23, the second winding T24, the first winding T21 and the first winding T22 is N:N:1:1. Consequently, the voltage between the two terminals of the ideal first winding T21' is also equal to the voltage V2, the voltage between the two terminals of the ideal second winding T23' is equal to N×V2, and the voltage between the two terminals of the ideal second winding T24' is equal to N×V2.

Consequently, the voltage V1 of the first terminal of the power conversion circuit 2 and the voltage Vc21 of the first flying capacitor Cb21 may be expressed by the following mathematical formula:

$$V1=Vc22+(2+N)\times V2 \quad (10); \text{ and}$$

$$Vc21=(2+N)\times V2 \quad (11)$$

The energy stored in the first flying capacitor Cb21 in the time interval between the time point t0 and the time point t1 is transmitted to the output terminal in the time interval between the time point t2 and the time point t3. The energy stored in the second flying capacitor Cb22 in the time interval between the time point t2 and the time point t3 is transmitted to the output terminal in the time interval between the time point t0 and the time point t1. According to the formulae (8), (9), (10) and (11), the voltage V1 of the first terminal of the power conversion circuit 2 may be deduced as: V1=(4+2N)×V2.

At the time point t3, the resonant currents iLr21 and iLr22 are equal to the magnetized currents iLm2 and -iLm2, respectively. Meanwhile, the fourth switch S23, the fifth switch S22 and the third switch Sr22 are turned off. Since the zero current switching (ZCS) function is achieved, the switching loss is decreased and the energy transfer efficiency of the power conversion circuit 2 is enhanced.

In the time interval between the time point t3 and the time point t4, all switches are turned off. The magnetized current iLm2 flowing through the magnetic element T-2 is in the freewheeling state. In addition, the charges on the parasitic capacitors of the first switch S21, the second switch S24 and the sixth switch Sr21 are extracted. Consequently, the terminal voltages of the first switch S21, the second switch S24 and the sixth switch Sr21 are decreased. In an embodiment, the first switch S21, the second switch S24 and the sixth switch Sr21 are turned on when the terminal voltages of the first switch S21, the second switch S24 and the sixth switch Sr21 are decreased to 50% of the respective initial voltages (i.e., the terminal voltages at the time point t1). Consequently, the switching loss is decreased, and the energy transfer efficiency and the power density of the power conversion circuit 2 are enhanced.

In another embodiment, the inductance of the magnetic element T-2 is controlled. Consequently, the inductance of the equivalent magnetized inductor Lm2 of the magnetic element T-2 is low enough, and the magnetized current iLm2 flowing through the equivalent magnetized inductor Lm2 is high enough. Since the charges on the parasitic capacitors of the first switch S21, the second switch S24 and the sixth switch Sr21 are extracted completely, the terminal voltages of the first switch S21, the second switch S24 and the sixth switch Sr21 are decreased to zero. At this time, the second switch S24 and the sixth switch Sr21 are turned on, the first switch S21, the second switch S24 and the sixth switch Sr21 are turned on. Consequently, the zero voltage switching (ZVS) function is achieved. In such way, the switching loss is further decreased, and the energy transfer efficiency and the power density of the power conversion circuit 2 are further enhanced.

In the time interval between the time point t0 and the time point t1 and in the time interval between the time point t2 and the time point t3, the resonant current iLr21 flows through the first winding T21 and the resonant current iLr22 flows through the first winding T22. In addition, the frequency of each of the resonant current iLr21 and the resonant current iLr22 is equal to the switching frequency. In this embodiment, the resonant cycle and the switching cycle are nearly equal.

In some other embodiments, the capacitances of the flying capacitors Cb21 and Cb22 are larger, and the inductance of the equivalent resonant inductor is smaller. Consequently, if the resonant currents iLr22 and iLr21 are respectively greater than the magnetized currents iLm1 and -iLm1 in the time interval between the time point t0 and the time point t1, the corresponding switches are turned off. If the resonant currents iLr22 and iLr21 are respectively greater than the magnetized currents -iLm2 and iLm2 in the time interval between the time point t2 and the time point t3, the corresponding switches are turned off. The turn-off current is greater than zero. However, since the inductance of the equivalent resonant inductor is low, the power loss caused by the non-zero current turning-off action may be neglected. In other words, the switching cycle of the power conversion circuit 2 is less than or equal to the resonant cycle of the resonant current. For reducing the power loss and increasing the energy transfer efficiency, it is preferred that the switching cycle Ts is greater than or equal to a half of the resonant cycle.

In an embodiment, the ratio of the input voltage V1 to the output voltage V2 is (4+2N):1. That is, the ratio of the input voltage V1 to the output voltage V2 may be adjusted according to the change of N. In this embodiment, the magnetic element T-2 includes the two first windings T21, T22 and the two second windings T23 and T24. These windings interact with each other to result in the electromagnetic coupling effect. Moreover, the turn ratio between the second winding T23, the second winding T24, the first winding T21 and the first winding T22 is N:N:1:1. Since the voltage gain of the power conversion circuit 2 is adjustable according to the turn numbers of the second winding T23 and T24, the applications of the power conversion circuit 2 are expanded.

In the embodiment, as shown in FIGS. 2C and 2D, the equivalent leakage inductors corresponding to the windings T21, T22, T23 and T24 are Lr21, Lr22, Lr23 and Lr24, respectively. For clearly analyzing the relationship between the resonant currents, the magnetized current iLm2 and the magnetized voltage VLm2 of the equivalent magnetized inductor Lm2 are neglected in the following example. In the time interval between the time point t0 and the time point t1 and the time interval between the time point t2 and the time point t3, the resonant effect between the flying capacitors Cb21, Cb22 and the equivalent leakage inductors Lr21, Lr22, Lr23 and Lr24 is generated. In this embodiment, the resonant capacitance of the power conversion circuit 2 is the sum of the capacitances of the flying capacitors Cb21 and Cb22, and the equivalent resonant inductance is equal to the parallel conductance of the equivalent leakage inductances Lr23 and Lr24 plus the equivalent leakage inductances Lr21 and Lr22 (i.e., the resonant capacitance of the power conversion circuit 2 is Lr23∥Lr24+Lr21+Lr22). If the magnetized current iLm2 is neglected, the output current io of the power conversion circuit 2 may be expressed by the following mathematic formula:

$$io=iLr21+iLr22 \quad (12)$$

In the above mathematic formula, iLr21 is the resonant current flowing through the equivalent leakage inductor Lr21, and iLr22 is the resonant current flowing through the equivalent leakage inductor Lr22.

In the time interval between the time point t0 and the time point t1, the resonant current iLr23 flowing through the equivalent leakage inductor Lr23 is equal to the resonant current iLr23 flowing through the equivalent leakage inductor Lr24. That is, $$iLr23 = iLr24 \quad (13)$$

The sum of the resonant current flowing through the equivalent leakage inductor Lr23 and the resonant current flowing through the equivalent leakage inductor Lr24 is equal to the resonant current iLr22 flowing through the equivalent leakage inductor Lr22. That is, $$iLr23 + iLr24 = iLr22 \quad (14)$$

According to the magnetic potential balance principle, the following mathematic formula is obtained.

$$N \times iLr23 + N \times iLr24 + iLr22 = iLr21 \quad (15)$$

According to the above mathematic formulae (13), (14) and (15), the resonant current iLr12 is equal to io/(N+2), and the resonant current iLr21 is equal to (N+1)×io/(N+2).

In the time interval between the time point t2 and the time point t3, the resonant current iLr23 flowing through the equivalent leakage inductor Lr23 is equal to the resonant current iLr24 flowing through the equivalent leakage inductor Lr24 (e.g., the formula (13)), and the sum of the resonant current flowing through the equivalent leakage inductor Lr23 and the resonant current flowing through the equivalent leakage inductor Lr24 is equal to the resonant current iLr22 flowing through the equivalent leakage inductor Lr22 (e.g., the formula (14)).

According to the magnetic potential balance principle, the following mathematic formula is obtained.

$$N \times iLr23 + N \times iLr24 + iLr21 = iLr22 \quad (16)$$

According to the above mathematic formulae (13), (14) and (16), the resonant current iLr21 is equal to io/(N+2), and the resonant current iLr22 is equal to (N+1)×io/(N+2).

From the above descriptions, the voltage gain of the power conversion circuit 2 is adjustable according to the turn numbers of the second winding T23 and T24 of the magnetic element T-2. The sum of the resonant currents iLr21 and iLr22 in the time interval between the time point t0 and the time point t1 and the sum of the resonant currents iLr21 and iLr22 in the time interval between the time point t2 and the time point t3 are equal. In other words, the resonant effect of the power conversion circuit 2 is not influenced by the second windings T23 and T24. The terminal voltage Vc21 of the first flying capacitor Cb21 is obtained by superimposing a DC voltage with an AC resonant voltage. Similarly, the terminal voltage Vc22 of the second flying capacitor Cb22 is obtained by superimposing a DC voltage with an AC resonant voltage. Typically, the DC voltage is equal to Vin/2, and thus the ratio of the DC voltage to the input voltage (e.g., the voltage of the first terminal of the power conversion circuit 2) is 0.5. However, when the device parameter distribution and other factors are taken into consideration, the ratio of the DC voltage to the input voltage is in the range between 0.4 and 0.6. The amplitudes of the AC resonant voltage of the terminal voltages Vc21 and Vc22 are determined according to the inductance of the equivalent resonant inductor, the capacitance of the equivalent resonant capacitor, the switching frequency of the power conversion circuit and the size of the load.

In the above embodiment, the equivalent resonant inductor comprises the leakage inductance caused by the coupling effect of the windings T21, T22, T23 and T24 and the parasitic inductance of the wiring structure. When the resonant cycle, the switching cycle and the capacitances of the flying capacitors Cb21 and Cb22 are taken into consideration, the coupling efficiency between every two of the windings T21, T22, T23 and T24 is preferably greater than 0.9.

Figure 2E:
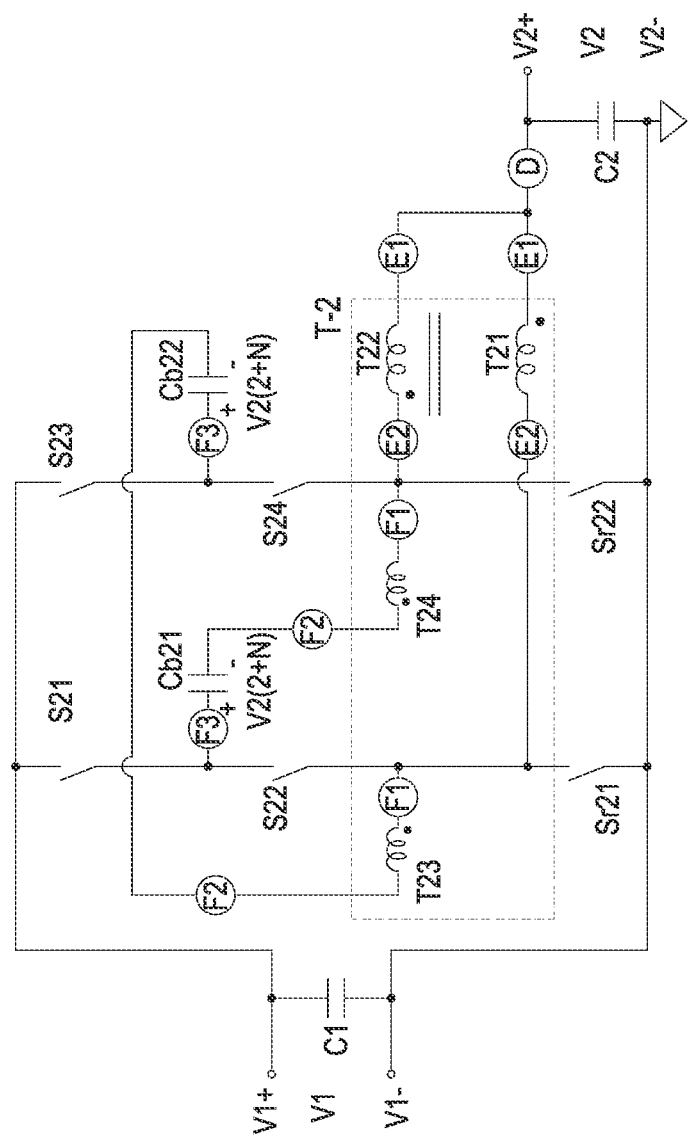
FIG. 2E is a schematic circuit diagram illustrating a power conversion circuit according to a fourth embodiment of the present invention.

FIG. 2E is a schematic circuit diagram illustrating a power conversion circuit according to a fourth embodiment of the present invention. In comparison with the third embodiment, the power conversion circuit of this embodiment further includes at least one external inductor (not shown).

The position of the at least one external inductor may be determined according to the practical requirements. In an example, one external inductor is serially connected between the second terminals of the first winding T21 or T22 and the second positive electrode V2+. That is, the external inductor is located at the position D. In another embodiment, two external inductors with the same inductance are serially connected with two first windings T21 and T22. That is, the two external inductors are located at the positions E1 or E2. In an example, at least one external inductor is serially connected to the first/second serially-connected branch. For example, one external inductor is located at the position F1, F2 or F3 two external inductors are respectively located at two of the positions F1, F2 or F3, or three external inductors are respectively located at the positions F1, F2 or F3. Consequently, a suitable resonant cycle is acquired. Nevertheless, the at least one external inductor is serially connected between the first terminal of the first switch S21 and the second positive electrode V2+.

In some embodiments, the third switch Sr22 and the sixth switch Sr21 are replaced by diodes. The diodes are used as freewheeling diodes. The switching cycle of the power conversion circuit is less than or equal to the resonant cycle. The equivalent circuit and the current waveform are similar to those of the above embodiment, and not redundantly described herein. For example, the switches are controllable switches such as MOS switches, SiC switches or GaN switches.

As mentioned above, the power conversion circuit 2 of the present invention has the function of converting the electric power in the bidirectional manner. Consequently, in case that the first terminal of the power conversion circuit 2 is the output terminal, the second terminal of the power conversion circuit 2 is the input terminal. The operations are similar to those of the first embodiment, and are not redundantly described herein. Under this circumstance, the ratio of the input voltage to the output voltage of the power conversion circuit 2 is 1:(4+2N).

The present invention further provides a power conversion apparatus. The power conversion apparatus includes M power conversion circuits, M is an integer greater than 1. The M power conversion circuits are connected with each other in an interleaving manner. Consequently, the carrying capability of the power conversion system is enhanced. The first terminals of the M power conversion circuits are connected with each other. The second terminals of the M power conversion circuits are connected with each other. The circuitry structures and the circuitry parameters of the M power conversion circuits are identical.

In an embodiment, each power conversion circuit has the circuit topology as shown in FIG. 1A. In case that M is an odd value, the M power conversion circuits are controlled according to M control signals. Each power conversion circuit is controlled according to one corresponding control signal. The phase difference between the control signals for controlling every two adjacent power conversion circuits is in the range between (360/M−20) degree and (360/M+20) degree. In case that M is an even value, the M power conversion circuits are controlled according to M/2 control signals. Every two power conversion circuits are controlled according to one corresponding control signal. For example, the m-th power conversion circuit and the (M/2+m)-th power conversion circuit are controlled according to the m-th control signal. The phase difference between the control signals for controlling every two adjacent power conversion circuits is in the range between (360/M−20) degree and (360/M+20) degree, wherein m is an integer smaller than M.

In another embodiment, each power conversion circuit has the circuit topology as shown in FIG. 2A. The M power conversion circuits are controlled according to M control signals. Each power conversion circuit is controlled according to one corresponding control signal. The phase difference between the control signals for controlling every two adjacent power conversion circuits is in the range between (360/2M−20) degree and (360/2M+20) degree.

In the following embodiments, taking the power conversion apparatus including two power conversion circuits as an example to illustrate the embodiments, where the two power conversion circuits are connected with each other in an interleaving manner.

Figure 3:
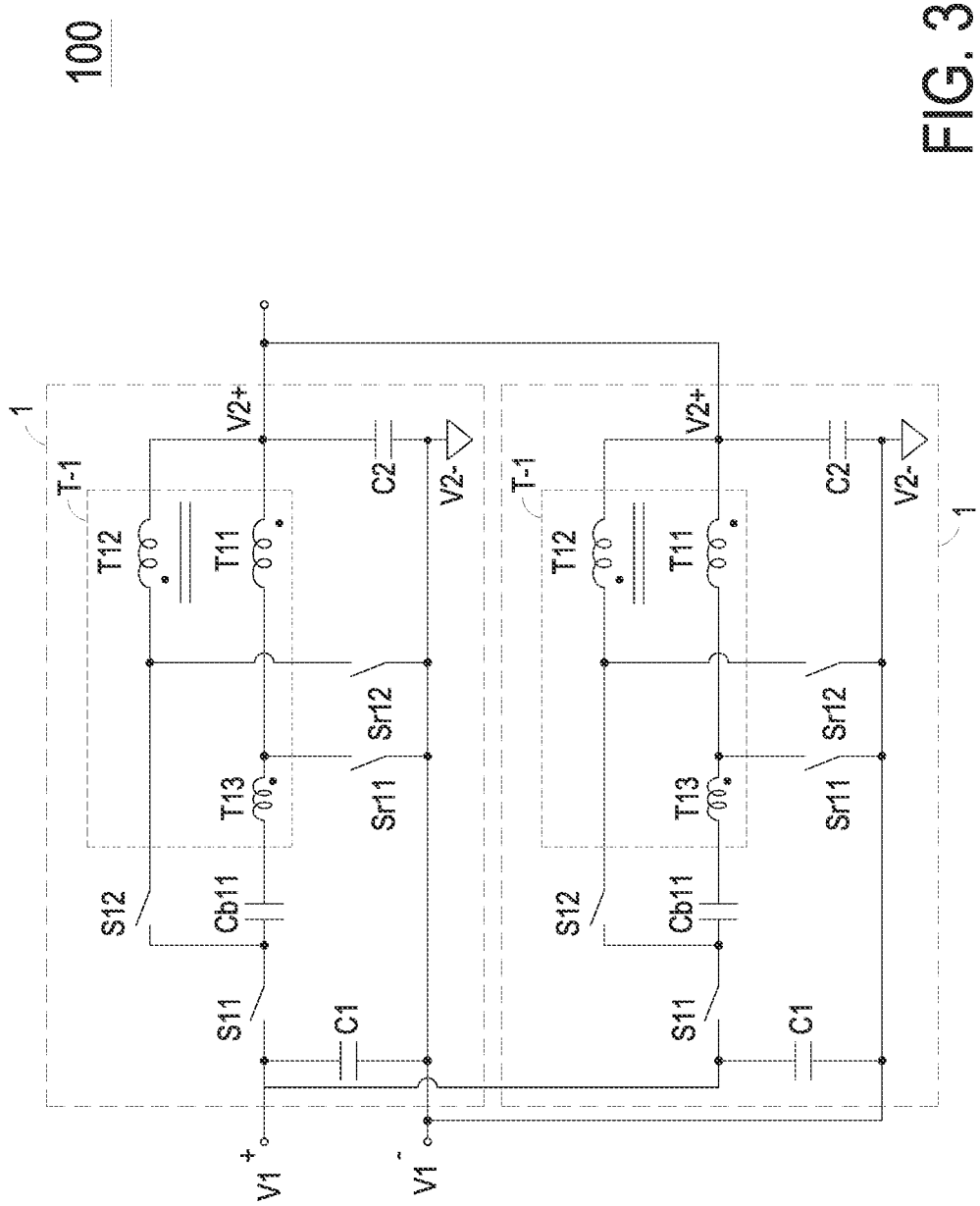
FIG. 3 is a schematic circuit diagram illustrating a power conversion apparatus according to a first embodiment of the present invention.

FIG. 3 is a schematic circuit diagram illustrating a power conversion apparatus according to a first embodiment of the present invention. As shown in FIG. 3, the power conversion apparatus 100 includes two power conversion circuits 1. Each power conversion circuit 1 has the circuitry structure as shown in FIG. 1A. The first terminals of the two power conversion circuits 1 are electrically connected with each other. The second terminals of the two power conversion circuits 1 are electrically connected with each other.

In the embodiment as shown in FIG. 3, each power conversion circuit 1 of the power conversion apparatus 100 includes a first capacitor C1 and a second capacitor C2. In a variant example, one first capacitor C1 is shared by the first terminals of the power conversion circuits 1, and one second capacitor C2 is shared by the second terminals of the power conversion circuits 1.

Figure 4:
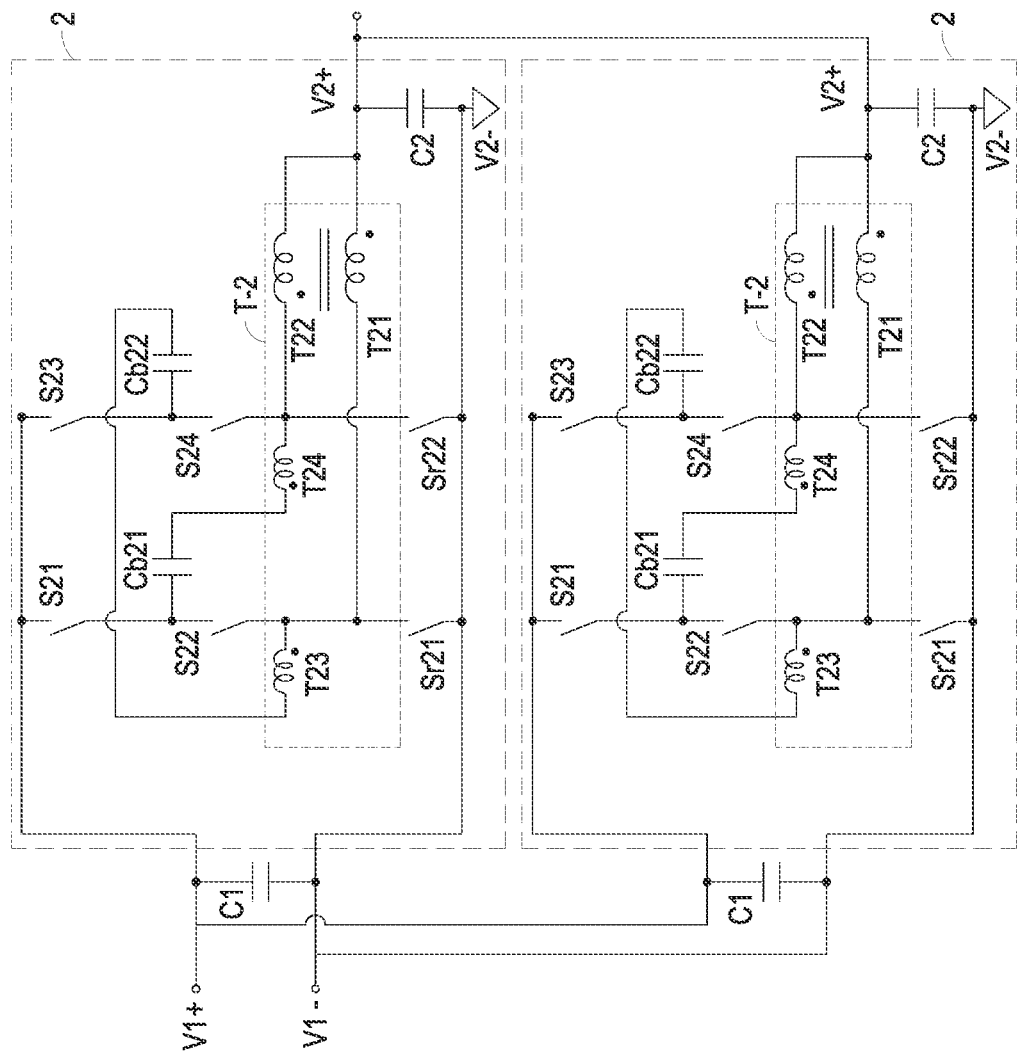
FIG. 4 is a schematic circuit diagram illustrating a power conversion apparatus according to a second embodiment of the present invention.

FIG. 4 is a schematic circuit diagram illustrating a power conversion apparatus according to a second embodiment of the present invention. As shown in FIG. 4, the power conversion apparatus 110 includes two power conversion circuits 2. Each power conversion circuit 2 has the circuitry structure as shown in FIG. 2A. The first terminals of the two power conversion circuits 2 are electrically connected with each other. The second terminals of the two power conversion circuits 2 are electrically connected with each other.

In the embodiment as shown in FIG. 4, each power conversion circuit 2 of the power conversion apparatus 110 includes a first capacitor C1 and a second capacitor C2. In a variant example, one first capacitor C1 is shared by the first terminals of the power conversion circuits 2, and one second capacitor C2 is shared by the second terminals of the power conversion circuit 2.

From the above descriptions, the present invention provides a power conversion circuit and a power conversion apparatus. The magnetic element of the power conversion circuit includes two first winding and at least one second winding. These windings interact with each other to result in the electromagnetic coupling effect. The turn ratio between the second winding and the first winding is N:1. Since the voltage gain of the power conversion circuit is adjustable according to the turn number of the second winding, the applications of the power conversion circuit are expanded.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion circuit, comprising:
a first terminal including a first positive electrode and a first negative electrode;
a second terminal including a second positive electrode and a second negative electrode, wherein the second negative electrode is electrically connected with the first negative electrode;
a first switching conversion unit comprising a first switch and a third switch, which are electrically connected with each other in series;
a second switching conversion unit comprising a second switch and a fourth switch, which are electrically connected with each other in series, wherein a first terminal of the first switch is electrically connected with a first terminal of the second switch, a second terminal of the first switch is electrically connected with the first positive electrode, a first terminal of the third switch and a first terminal of the fourth switch are electrically connected with the first negative electrode, and a second terminal of the fourth switch is electrically connected with a second terminal of the second switch, wherein the first switch, the second switch, the third switch and the fourth switch are periodically operated at a switching cycle, and the switching cycle has a duty cycle;
a flying capacitor; and
a magnetic element comprising two first windings and a second winding, wherein the two first windings and the second winding interact with each other to result in an electromagnetic coupling effect, wherein second terminals of the two first windings are opposite-polarity terminals and electrically connected with the second positive electrode, a first terminal of a first one of the two first windings is electrically connected with a second terminal of the third switch, a first terminal of a second one of the two first windings is electrically connected with the second terminal of the fourth switch, and the second winding and the flying capacitor are serially connected between the first terminal of the first switch and the first terminal of the first one of the two first windings, wherein a turn ratio between the second winding, the first one of the two first windings and the second one of the two first windings is N:1:1, and N is a positive value.

2. The power conversion circuit according to claim 1, wherein the switching cycle comprises a first working period and a second working period, wherein a current flowing through the second winding is equal to a current flowing through the first one of the two first windings during the first working period, and the current flowing through the second winding is equal to a current flowing through the second one of the two first windings during the second working period.

3. The power conversion circuit according to claim 1, wherein the power conversion circuit has a function of converting electric power in a bidirectional manner, wherein if the first terminal of the power conversion circuit is an input terminal, the second terminal of the power conversion circuit is an output terminal, wherein if the first terminal of the power conversion circuit is the output terminal, the second terminal of the power conversion circuit is the input terminal.

4. The power conversion circuit according to claim 1, wherein a first terminal of the second winding and the first terminal of the first one of the two first windings are opposite-polarity terminals, the first terminal of the second winding is electrically connected with the first terminal of the first one of the two first windings, and a second terminal of the second winding is electrically connected with the flying capacitor; or wherein a first terminal of the flying capacitor is electrically connected with the first terminal of the first one of the two first windings, and a second terminal of the flying capacitor is electrically connected with the first terminal of the second winding.

5. The power conversion circuit according to claim 1, wherein on/off states of the first switch and the fourth switch are identical, on/off states of the second switch and the third switch are identical, and a phase difference between the on/off states of the first switch and the second switch is 180 degrees, wherein time durations of the first switch and the second switch are less than or equal to 0.5×Ts and greater than or equal to 0.4×Ts, wherein the switching period is Ts.

6. The power conversion circuit according to claim 1, wherein the power conversion circuit comprises an equivalent resonant inductor, and a resonant effect between the equivalent resonant inductor and the flying capacitor generates a resonant current with a resonant frequency and a resonant cycle, wherein the switching cycle of the power conversion circuit is less than or equal to the resonant cycle, and the switching cycle is greater than or equal to a half of the resonant cycle.

7. The power conversion circuit according to claim 6, wherein the equivalent resonant inductor comprises a leakage inductance of the magnetic element and a parasitic inductance of a wiring structure; or the equivalent resonant inductor comprises at least one external inductor, and the at least one external inductor is serially connected between the first terminal of the first switch and the second positive electrode.

8. The power conversion circuit according to claim 1, wherein the two first windings and the second winding are wound around a same pillar of a magnetic core of the magnetic element, wherein a coupling efficiency between every two of the two first windings and the second winding is greater than 0.9.

9. The power conversion circuit according to claim 1, wherein during the switching cycle, electric energy is stored in the flying capacitor and transmitted to an output terminal of the power conversion circuit according to the on/off states of the corresponding switches of the first switch, the second switch, the third switch and the fourth switch, wherein the flying capacitor has a DC voltage, the first terminal of the power conversion circuit has a terminal voltage, and a ratio of the DC voltage to the terminal voltage is in a range between 0.4 and 0.6.

10. The power conversion circuit according to claim 1, wherein a ratio of a terminal voltage of the first terminal of the power conversion circuit to a terminal voltage of the second terminal of the power conversion circuit is (4+2N):1.

11. A power conversion circuit, comprising:
a first terminal including a first positive electrode and a first negative electrode;
a second terminal including a second positive electrode and a second negative electrode, wherein the second negative electrode is electrically connected with the first negative electrode;
a magnetic element comprising two first windings and at least one second winding, wherein the two first windings and the at least one second winding interact with each other to result in an electromagnetic coupling effect, wherein second terminals of the two first windings are opposite-polarity terminals and electrically connected with the second positive electrode, wherein a turn ratio between the at least one second winding, a first one of the two first windings and a second one of the two first windings is N:1:1, and N is a positive value;
a plurality of switches, wherein each of the plurality of switches is electrically connected with the magnetic element, wherein the plurality of switches are periodically operated at a switching cycle, and the switching cycle has a duty cycle;
wherein the switching cycle comprises a first working period and a second working period, wherein a current flowing through the at least one second winding is equal to a current flowing through the first one of the two first windings during the first working period, and the at least one second winding is serially connected with the first one of the two first windings, wherein the current flowing through the at least one second winding is equal to a current flowing through the second one of the two first windings during the second working period, and the at least one second winding is serially connected with the second one of the two first windings.

12. The power conversion circuit according to claim 11, wherein the power conversion circuit comprises a flying capacitor, and the flying capacitor and the at least one second winding form a serially-connected branch, wherein the serially-connected branch is electrically connected between one of the plurality of switches and the first one of the two first windings.

13. The power conversion circuit according to claim 12, wherein the power conversion circuit comprises an equivalent resonant inductor, and a resonant effect between the equivalent resonant inductor and the flying capacitor generates a resonant current with a resonant frequency and a resonant cycle, wherein the switching cycle of the power conversion circuit is less than or equal to the resonant cycle, and the switching cycle is greater than or equal to a half of the resonant cycle.

14. The power conversion circuit according to claim 13, wherein the equivalent resonant inductor comprises a leakage inductance of the magnetic element and a parasitic inductance of a wiring structure; or the equivalent resonant inductor comprises at least one external inductor, and the at least one external inductor is serially connected between one of the plurality of switches and the second positive electrode.

15. The power conversion circuit according to claim 12, wherein during the switching cycle, electric energy is stored in the flying capacitor and transmitted to an output terminal of the power conversion circuit according to the on/off states of the corresponding switches, wherein the flying capacitor has a DC voltage, the first terminal of the power conversion circuit has a terminal voltage, and a ratio of the DC voltage to the terminal voltage is in a range between 0.4 and 0.6.

16. The power conversion circuit according to claim 11, wherein a ratio of a terminal voltage of the first terminal of the power conversion circuit to a terminal voltage of the second terminal of the power conversion circuit is (4+2N):1.

17. The power conversion circuit according to claim 11, wherein a part of the plurality of switches are electrically connected with the first positive electrode of the power conversion circuit, and another part of the plurality of switches are electrically connected with the first negative electrode of the power conversion circuit.

\* \* \* \* \*